(12) United States Patent
Sakaguchi (10) Patent No.: US 11,389,886 B2
(45) Date of Patent: Jul. 19, 2022

(54) ELECTRIC DISCHARGE MACHINING APPARATUS

(71) Applicant: SODICK CO., LTD., Kanagawa (JP)

(72) Inventor: Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 332 days.

(21) Appl. No.: 16/578,412

(22) Filed: Sep. 23, 2019

(65) Prior Publication Data

US 2020/0122251 A1    Apr. 23, 2020

(30) Foreign Application Priority Data

Oct. 19, 2018   (JP) .............................. JP2018-197256

(51) Int. Cl.
  *B23H 1/02* (2006.01)
  *B23H 7/08* (2006.01)
  *B23Q 17/09* (2006.01)

(52) U.S. Cl.
  CPC ................. *B23H 1/02* (2013.01); *B23H 7/08* (2013.01); *B23Q 17/0985* (2013.01);
  (Continued)

(58) Field of Classification Search
  CPC ........ B23H 1/02; B23H 7/08; B23Q 17/0985; G05B 2219/45043; G05B 2219/45221; G05B 2219/49329; G05B 2219/50331
  See application file for complete search history.

(56) References Cited

U.S. PATENT DOCUMENTS 5,387,061 A * 2/1995 Barkman ............... B23Q 17/24
                                                318/568.1
5,623,857 A   4/1997 Sakuraba
(Continued)

FOREIGN PATENT DOCUMENTS

JP   S6159860   12/1986
JP   2838198    12/1998
(Continued)

OTHER PUBLICATIONS

University of North Carolina Measurements and Error Analysis p. 18 (Year: 2011).*

(Continued)

*Primary Examiner* — Joel M Attey
*Assistant Examiner* — Franklin Jefferson Wang
(74) *Attorney, Agent, or Firm* — JCIPRNET (57) ABSTRACT

The disclosure provides an electric discharge machining apparatus. The apparatus includes: temperature sensors respectively attached to an upper portion, a middle portion, and a lower portion of the electric discharge machining apparatus and measuring temperatures of the electric discharge machining apparatus at predetermined time intervals; a control device calculating values of temperature environment diagnostic indexes, which are indexes for determining machining accuracy of the workpiece obtained when electric discharge machining is performed in a current temperature environment, from measurement results of the temperature sensors, comparing the values of the temperature environment diagnostic indexes with reference values of the temperature environment diagnostic indexes recommended for achieving desired machining accuracy, and outputting determination results indicating a degree of whether the current temperature environment around the electric discharge machining apparatus is appropriate for achieving the desired machining accuracy according to differences; and a storage part storing the reference values and the determination results.

16 Claims, 2 Drawing Sheets

(52) U.S. Cl.
CPC .............. *G05B 2219/45043* (2013.01); *G05B 2219/45221* (2013.01); *G05B 2219/49329* (2013.01); *G05B 2219/50331* (2013.01)

(56) References Cited

U.S. PATENT DOCUMENTS

| | | | | |
|---|---|---|---|---|
| 5,834,049 | A | 11/1998 | Kageyama | |
| 10,088,826 | B2 * | 10/2018 | Jalluri | G05B 19/401 |
| 10,300,543 | B2 * | 5/2019 | Hada | B23H 7/26 |
| 2013/0206730 | A1 * | 8/2013 | Furukawa | B23H 7/04 |
| | | | | 219/69.12 |
| 2013/0325164 | A1 * | 12/2013 | Wwatanabe | B23H 7/18 |
| | | | | 700/186 |
| 2014/0076855 | A1 * | 3/2014 | Takemoto | G05B 19/406 |
| | | | | 219/69.11 |
| 2016/0288230 | A1 * | 10/2016 | Furuta | B23H 1/024 |
| 2018/0161900 | A1 * | 6/2018 | Yang | B23H 7/20 |
| 2018/0196405 | A1 | 7/2018 | Maekawa | |
| 2019/0235470 | A1 * | 8/2019 | Maekawa | G01K 15/007 |

FOREIGN PATENT DOCUMENTS

| | | | |
|---|---|---|---|
| JP | 2004042260 | | 2/2004 |
| JP | 2004042260 | A * | 2/2004 |
| JP | 2008296314 | | 12/2008 |
| JP | 2012200854 | | 10/2012 |
| JP | 2018111145 | | 7/2018 |

OTHER PUBLICATIONS

English translation of "Office Action of Japan Counterpart Application," dated Mar. 13, 2019, p. 1-p. 4.

* cited by examiner

ELECTRIC DISCHARGE MACHINING APPARATUS

CROSS-REFERENCE TO RELATED APPLICATION

This application claims the priority of Japan patent application serial no. 2018-197256, filed on Oct. 19, 2018. The entirety of the above-mentioned patent application is hereby incorporated by reference herein and made a part of this specification.

BACKGROUND

Technical Field

The disclosure relates to an electric discharge machining apparatus that machines a workpiece by electric discharge machining.

Description of Related Art

An electric discharge machining apparatus such as a wire electric discharge machining apparatus and an engraving electric discharge machining apparatus is installed in a desired place with the surrounding environment and the electric discharge machining apparatus itself adjusted. Therefore, at the beginning of installation of the electric discharge machining apparatus, the machining accuracy is unlikely to decrease except for artificial factors.

However, when the service life of the apparatus has passed a certain time, an unexpected decrease in machining accuracy may occur due to various factors that did not have to be considered at the time of installing the electric discharge machining apparatus, such as thermal displacement and installation errors resulting from change of the temperature environment around the electric discharge machining apparatus.

To deal with the decrease in machining accuracy caused by thermal displacement that results from change of the temperature environment, for example, in Patent Document 1 and 2, the temperature changes of the machine body are detected at at least two locations where temperature changes occur with different time constants under the influence of a heat source, and the detected temperature changes are synthesized to calculate a synthetic temperature change having a time constant substantially the same as the time constant of the thermal displacement of the machine tool, and the machining error is corrected based on the thermal displacement that changes corresponding to the synthetic temperature change.

RELATED ART

Patent Document

[Patent Document 1] Japanese Patent Application Laid-open No. 2004-042206
[Patent Document 2] U.S. Pat. No. 5,623,857

However, as described above, there are various factors that cause the machining accuracy of the electric discharge machining apparatus, which has served over a certain time, to decrease. Thus, it is very difficult to identify the cause of the decrease in machining accuracy before taking specific countermeasures as described in Patent Document 1 and 2. Therefore, the operator has to visit the site to investigate the causes one by one, and it takes a long time to identify the causes and deal with them after the problem occurred.

SUMMARY

An electric discharge machining apparatus according to the first aspect of the disclosure is an electric discharge machining apparatus for machining a workpiece by electric discharge machining. The electric discharge machining apparatus includes: temperature sensors respectively attached to an upper portion, a middle portion, and a lower portion of the electric discharge machining apparatus and measuring temperatures of the electric discharge machining apparatus at predetermined time intervals; a control device calculating values of temperature environment diagnostic indexes, which are indexes for determining machining accuracy of the workpiece obtained when electric discharge machining is performed in a current temperature environment, from measurement results of the temperature sensors, comparing the values of the temperature environment diagnostic indexes with reference values of the temperature environment diagnostic indexes recommended for achieving desired machining accuracy, and outputting determination results indicating a degree of whether the current temperature environment around the electric discharge machining apparatus is appropriate for achieving the desired machining accuracy according to differences in the comparing; and a storage part storing the reference values and the determination results, wherein the temperature environment diagnostic indexes are indexes including temperature and time variables, and include at least one of an average reference temperature change range, an average upper and lower temperature difference fluctuation range, and an average reference temperature change rate, wherein the average reference temperature change range is an average value of a maximum change range of a reference temperature measured by the temperature sensor attached to the middle portion of the electric discharge machining apparatus in a predetermined period, the average upper and lower temperature difference fluctuation range is an average value of a difference between a maximum and a minimum of a temperature difference between the temperature measured by the temperature sensor attached to the upper portion of the electric discharge machining apparatus and the temperature measured by the temperature sensor attached to the lower portion of the electric discharge machining apparatus in a predetermined period, and the average reference temperature change rate is an average value of a maximum change rate of the reference temperature in a predetermined period.

DESCRIPTION OF THE EMBODIMENTS

In view of the above, the disclosure provides an electric discharge machining apparatus that can reduce the time required to deal with the decrease in machining accuracy after the decrease occurs.

In the disclosure, when a decrease in machining accuracy occurs, the influence of the current temperature environment on the machining accuracy can be easily grasped by calculating and determining the temperature environment diagnostic indexes. Therefore, it is possible to immediately determine whether the decrease in machining accuracy occurs due to the temperature environment, which is one of the main factors causing a decrease in machining accuracy. More specifically, if the determination result of the temperature environment diagnostic index is not favorable, the cause of the decrease in machining accuracy is likely to be the temperature environment. Accordingly, the operator may try to improve the temperature environment around the electric discharge machining apparatus. In addition, for example, if the determination result of the temperature environment diagnostic index is favorable, the cause of the decrease in machining accuracy is probably not the temperature environment. Therefore, the operator may try to check the environment around the electric discharge machining apparatus, excluding the temperature environment, and the condition of the electric discharge machining apparatus. Compared with investigating the cause of the decrease in machining accuracy from the beginning as described in the related art, it is possible to limit the cause of the decrease in machining accuracy. Thus, it is possible to reduce the time for identifying the cause and dealing with it after the problem occurs. In addition, by setting at least one of the average reference temperature change range, the average upper and lower temperature difference fluctuation range, and the average reference temperature change rate as the temperature environment diagnostic indexes, it is possible to accurately determine whether the cause of the decrease in machining accuracy is the temperature environment around the electric discharge machining apparatus, wherein the average reference temperature change range is the average value of the maximum change range of the reference temperature measured by the temperature sensor attached to the middle portion of the electric discharge machining apparatus in a predetermined period, the average upper and lower temperature difference fluctuation range is the average value of the difference between the maximum and the minimum of the temperature difference between the temperature measured by the temperature sensor attached to the upper portion of the electric discharge machining apparatus and the temperature measured by the temperature sensor attached to the lower portion of the electric discharge machining apparatus in a predetermined period, and the average reference temperature change rate is the average value of the maximum change rate of the reference temperature in a predetermined period.

The electric discharge machining apparatus according to the second aspect of the disclosure is characterized in that, with reference to the first aspect, the control device outputs one overall determination result calculated based on the determination results.

In the disclosure, the control device outputs one overall determination result calculated based on the determination results. Accordingly, by checking only one overall determination result, it is possible to determine whether the cause of the decrease in machining accuracy is the temperature environment more simply at a glance.

Here, for example, if the decrease in machining accuracy is caused by installation errors, since the amount of deviation generated during machining is a constant value, it is easy to deal with such a problem. On the other hand, if the cause of the decrease in machining accuracy is thermal displacement resulting from the temperature environment, the amount of deviation generated during machining changes with the temperature change of the apparatus main body, so it is difficult to deal with.

The electric discharge machining apparatus according to the third aspect of the disclosure is characterized in that, with reference to the first or second aspect, a countermeasure for improving the determination results is stored in the storage part, and the control device outputs the countermeasure corresponding to the determination results that has been calculated.

In the disclosure, the storage part stores the countermeasure for improving the determination results, and the control device outputs the countermeasure corresponding to the determination results that has been calculated. By presenting a specific method for improving the temperature environment based on past empirical rules in addition to the determination results (overall determination result), it is possible to promptly and accurately deal with the decrease in machining accuracy caused by the temperature environment, which is particularly difficult to handle.

The electric discharge machining apparatus according to the fourth aspect of the disclosure is characterized in that, with reference to any one of the first to third aspects, the control device calculates an average reference temperature difference, which is a difference between an average value of a reference temperature difference in a predetermined period when an average value of the reference temperature is the highest throughout a year, and an average value of the reference temperature in a predetermined period when the average value of the reference temperature is the lowest, and the control device compares a value of the average reference temperature difference with a reference value of the average reference temperature difference recommended for achieving the desired machining accuracy, and outputs a determination result indicating a degree of possibility of a decrease in machining accuracy according to a difference in the comparing.

In the disclosure, the control device calculates the average reference temperature difference, which is the difference between the average value of the reference temperature difference in a predetermined period when the average value of the reference temperature is the highest throughout a year, and the average value of the reference temperature in a predetermined period when the average value of the reference temperature is the lowest, and the control device compares the value of the average reference temperature difference with the reference value of the average reference temperature difference recommended for achieving the desired machining accuracy, and outputs the determination result indicating the degree of possibility of a decrease in machining accuracy according to the difference. Thereby, it is possible to determine the possibility of a decrease in machining accuracy in the current temperature environment.

The electric discharge machining apparatus according to the fifth aspect of the disclosure is characterized in that, with reference to any one of the first to fourth aspects, the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

In the disclosure, the control device calculates the average operation rate of the electric discharge machining apparatus in a predetermined period, compares the value of the average operation rate with the reference value of the average operation rate recommended for achieving the desired machining accuracy, and outputs the determination result indicating the degree of reliability of the determination result according to the difference in the comparing. Thereby, the reliability of the above determination result can be determined.

Effects

According to the disclosure, it is possible to reduce the time required to deal with the decrease in machining accuracy after the decrease occurs.

Figure 1:
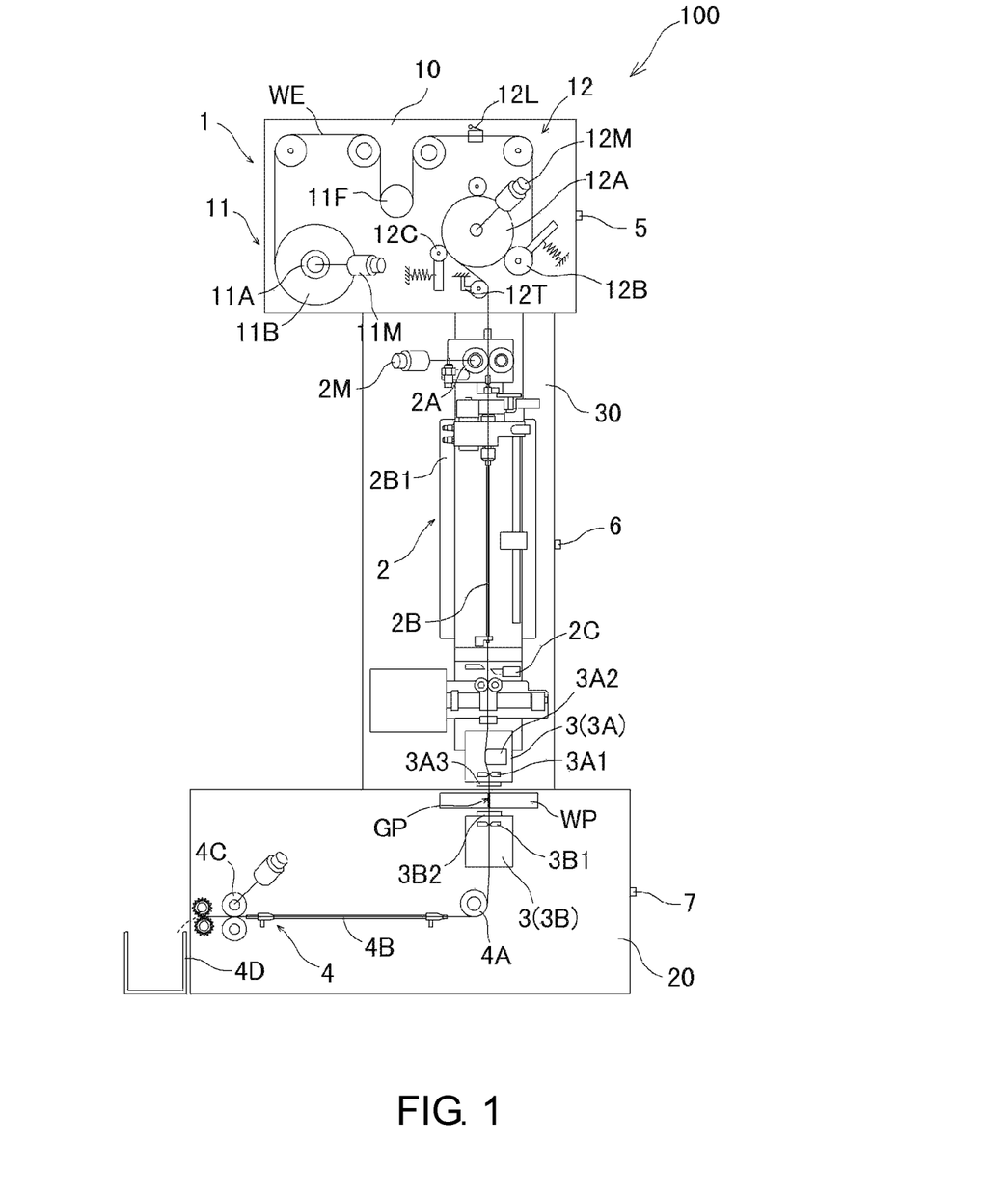
FIG. 1 is an overall schematic view of an apparatus main body of a wire electric discharge machining apparatus according to an embodiment.

As shown in FIG. 1, an apparatus main body 100 of a wire electric discharge machining apparatus includes a traveling device 1, a wiring device 2, a wire guide unit 3, a machining power supply device and a relative movement device (not shown), a discharge device 4, a control device 8, etc.

A part where the traveling device 1, the wiring device 2, the wire guide unit 3, the relative movement device, etc. are disposed is referred to as the apparatus main body 100. The apparatus main body 100 includes a head 10 provided with the traveling device 1, etc. for guiding a wire electrode WE to the wire guide unit 3 via the wiring device 2; a bed 20 provided with the relative movement device, etc. for relatively moving the wire electrode WE with respect to a machining tank, in which a workpiece WP is machined, and the workpiece WP; and a column part 30 connecting the head 10 and the bed 20. The apparatus main body 100 is configured so that the head 10 provided in the upper portion of the apparatus main body 100, the column part 30 provided in the middle portion of the apparatus main body 100, and the bed 20 provided in the lower portion of the apparatus main body 100 are arranged in this order from the top.

Temperature sensors 5, 6, and 7 that continuously measure the temperatures of the upper portion, the middle portion, and the lower portion of the apparatus main body 100 at predetermined time intervals respectively are attached to the head 10, the column part 30, and the bed 20. The temperature measured by the temperature sensor 6 that is disposed in the column part 30 positioned in the middle portion of the apparatus main body 100 is taken as the reference temperature of the apparatus main body 100.

The traveling device 1 includes a supply device 11 and a tension device 12. The supply device 11 is a means for supplying the wire electrode WE to a machining gap GP. The supply device 11 includes a reel 11A, a wire bobbin 11B, a servo pulley 11F, and a brake 11M. Nevertheless, the wire bobbin 11B is a replaceable consumable part that stores a predetermined length of wire electrode WE by winding it around the axis. The wire bobbin 11B is loaded to the reel 11A and rotates.

The reel 11A rotates according to the speed at which the tension device 12 continuously pulls out the wire electrode WE from the wire bobbin 11B. The brake 11M is, for example, a torque motor or a powder clutch. The brake 11M is disposed to be directly connected to the rotation shaft of the reel 11A and prevents the wire bobbin 11B from idling by applying a load in a range where the reel 11A can rotate in the direction opposite to the rotation direction of the reel 11A. The servo pulley 11F moves up and down according to fluctuation of the tension of the wire electrode WE by its own weight and absorbs the vibration of the traveling wire electrode WE supplied from the wire bobbin 11B.

The tension device 12 is a means for feeding out the wire electrode WE from the wire bobbin 11B and sequentially sending it to the machining gap GP. Moreover, the tension device 12 is a means for applying a predetermined tension to the wire electrode WE supplied to the machining gap GP between the tension device 12 and a rotation device. The tension device 12 includes a drive roller 12A, a driven roller 12B, a pinch roller 12C, and a servo motor 12M. A strain gauge 12T is a tension detector. A limit switch 12L is a broken wire detector.

The drive roller 12A serves as a delivery roller for pulling out the wire electrode WE from the wire bobbin 11B and sending it to the machining gap GP as well as a tension roller for applying a predetermined tension to the wire electrode WE. The wire electrode WE is wound to detour around the outer circumference of the drive roller 12A by the driven roller 12B and the pinch roller 12C. The drive roller 12A is rotated by the servo motor 12M. The control device 8 controls the rotational speed of the servo motor 12M based on the tension detected by the strain gauge 12T to keep the tension constant.

The wiring device 2 is a means for stretching the wire electrode WE. The wiring device 2 of the wire electric discharge machining apparatus of the embodiment includes a delivery roller 2A, a guide pipe 2B, and a cutter 2C. The delivery roller 2A is a means rotated by a delivery motor 2M to send out the wire electrode WE. The guide pipe 2B is a means for guiding the tip of the wire electrode WE to an upper wire guide unit 3A. The guide pipe 2B is contained in a guide pipe holding box 2B1. The cutter 2C is a means for cutting the wire electrode WE. The cutter 2C can be replaced with other means for cutting the wire electrode WE, such as a heating roller for melting the wire electrode WE.

The wire guide unit 3 includes the upper wire guide unit 3A and a lower wire guide unit 3B. The upper wire guide unit 3A is an assembly formed by integrating a wire guide 3A1, a conductor 3A2, and a jet nozzle 3A3, wherein the wire guide 3A1 positions and guides the wire electrode WE, the conductor 3A2 supplies power to the wire electrode WE, and the jet nozzle 3A3 supplies a machining fluid jet in a downward direction coaxially with the wire electrode WE to the machining gap GP between the workpiece WP and a core WP1 cut out from the workpiece WP. The lower wire guide unit 3B is an assembly formed by integrating a wire guide 3B1 and a jet nozzle 3B2, wherein the wire guide 3B1 positions and guides the wire electrode WE, and the jet nozzle 3B2 supplies a machining fluid jet in an upward direction coaxially with the wire electrode WE to the machining gap GP between the workpiece and the core cut out from the workpiece.

The machining power supply device is a means for continuously supplying a discharge current pulse having desired waveform and peak current value to the machining gap GP. The relative movement device is a means for relatively moving the wire electrode WE and the workpiece WP in the horizontal two axial directions. The relative movement device includes a taper device that tilts with respect to the wire electrode WE and the workpiece WP.

The discharge device 4 is a means for recovering the used wire electrode WE that has been consumed for machining from the machining part. The discharge device 4 includes an idling roller 4A for offsetting the delivery path of the wire electrode WE stretched vertically from the workpiece WP and changing the traveling direction of the wire electrode WE sent out, a transport device 4B for transporting the wire electrode WE with a fluid, a winding roller 4C for winding the wire electrode WE, and a bucket 4D for recovering the used wire electrode WE.

The control device 8 is a means for controlling the operation of the wire electric discharge machining apparatus. The control device 8 is respectively connected to the traveling device 1, the wiring device 2, the machining power supply device, and the relative movement device by one or more signal lines. The control device 8 executes a predetermined sequence operation on the workpiece WP based on an instruction sent from an output part of the calculation part 8*b*.

However, when the service life of the wire electric discharge machining apparatus has passed a certain time, an unexpected decrease in machining accuracy may occur due to various factors that did not have to be considered at the time of installing the wire electric discharge machining apparatus, such as thermal displacement and installation errors of the apparatus main body 100 resulting from change of the surrounding temperature environment. In such a case, it is necessary to deal with and solve the problem as soon as possible. However, as described above, there are various factors that cause the machining accuracy of the wire electric discharge machining apparatus, which has served over a certain time, to decrease, and it is very difficult to identify the causes of the problem before taking specific countermeasures. Therefore, the operator has to visit the site to investigate the causes one by one, and it takes a long time to identify the causes and deal with them after the problem occurred.

Thus, in the present embodiment, whether the current temperature environment is appropriate for achieving the desired machining accuracy is determined by using a temperature environment diagnostic index calculated from the temperature measurement results of the temperature sensors 5, 6, and 7 respectively attached to the upper portion, the middle portion, and the lower portion of the apparatus main body 100, so as to limit the cause of the decrease in machining accuracy. The temperature environment diagnostic index is described in detail below.

The temperature environment diagnostic index is an index for determining the machining accuracy of the workpiece WP obtained when wire electric discharge machining is performed in the current temperature environment. The temperature environment diagnostic index is expressed as an index that includes temperature and time variables. The temperature environment diagnostic index is, for example, an average reference temperature change range, an average upper and lower temperature difference fluctuation range, and an average reference temperature change rate.

The average reference temperature change range is the monthly average value of the maximum change range of the reference temperature of each day. The average reference temperature change range is expressed as $(\Sigma\Delta T)/D$ where $\Sigma\Delta T$ is the total sum value per month of the maximum change range of the reference temperature measured by the temperature sensor 6 attached to the column part 30 positioned in the middle portion of the apparatus main body 100 each day, and D is the number of days of operability of the apparatus main body 100 in the corresponding month.

The average upper and lower temperature difference fluctuation range is the monthly average value of the difference between the maximum and the minimum of the temperature of the upper portion and the lower portion of the apparatus main body 100 of each day. The average upper and lower temperature difference fluctuation range is expressed as $\{\Sigma\Delta(Tu-Tb)\}/D$ where $\Sigma\Delta(Tu-Tb)$ is the total value per month of the difference between the maximum and the minimum of the temperature measured by the temperature sensor 5 attached to the head 10 positioned in the upper portion of the apparatus main body 100 and the temperature measured by the temperature sensor 7 attached to the bed 20 positioned in the lower portion of the apparatus main body 100 each day, and D is the number of days of operability of the apparatus main body 100 in the corresponding month.

The average reference temperature change rate is the monthly average value of the maximum change rate of the reference temperature of each day. The average reference temperature change rate is expressed as $(\Sigma MAX\Delta Th)/D$ where $\Sigma MAX\Delta Th$ is the total value per month of the maximum temperature change per hour of the reference temperature of each day, and D is the number of days of operability of the apparatus main body 100 in the corresponding month.

In the present embodiment, the determination results for the three temperature environment diagnostic indexes are respectively calculated from the differences between the three temperature environment diagnostic indexes calculated based on the above formulae, and the reference value of each temperature environment diagnostic index recommended for achieving the desired machining accuracy. Then, by measuring the influence of the temperature environment on machining accuracy from the overall determination result calculated based on these determination results, the cause of the decrease in machining accuracy is limited.

The determination result of the temperature environment diagnostic index and the overall determination result are presented as one of the following three determinations, i.e., A, B, and C, in the descending order of evaluation.

If the overall determination result is presented as A, the operator determines that "the current temperature environment is an environment favorable for achieving the desired machining accuracy and has small influence on machining accuracy" and tries to improve the environment around the wire electric discharge machining apparatus, excluding the temperature environment, and checks the condition of the wire electric discharge machining apparatus. In addition, if the overall determination result is presented as B, the operator determines that "the current temperature environment is an environment that has room for improvement to achieve the desired machining accuracy and the influence on machining accuracy is neither small nor large" and tries to improve the environment around the wire electric discharge machining apparatus, including the temperature environment, and checks the condition of the electric discharge machining apparatus. Further, if the overall determination result is presented as C, the operator determines that "the current temperature environment is an environment that should be improved to achieve the desired machining accuracy and has large influence on machining accuracy" and tries to improve the temperature environment around the wire electric discharge machining apparatus.

The following shows the reference value of the temperature environment diagnostic index when the desired machining accuracy is set to ±5 μm, and the determination result corresponding to the difference between the calculated temperature environment diagnostic index and the reference value.

The reference value of the average reference temperature change range is set to 2 degrees or less. When the calculated average reference temperature change range is 2 degrees or less, that is, when the difference between the calculated average reference temperature change range and the reference value is 0, the determination result of the average reference temperature change range is A. When the calculated average reference temperature change range is more than 2 degrees and less than 3 degrees, that is, when the difference between the calculated average reference temperature change range and the reference value is more than 0 and less than 1 degree, the determination result of the average reference temperature change range is B. When the calculated average reference temperature change range is 3 degrees or more, that is, when the difference between the calculated average reference temperature change range and the reference value is 1 degree or more, the determination result of the average reference temperature change range is C.

The reference value of the average upper and lower temperature difference fluctuation range is set to 2 degrees or less. When the calculated average upper and lower temperature difference fluctuation range is 2 degrees or less, that is, when the difference between the calculated average upper and lower temperature difference fluctuation range and the reference value is 0, the determination result of the average upper and lower temperature difference fluctuation range is A. When the calculated average upper and lower temperature difference fluctuation range is more than 2 degrees and less than 3 degrees, that is, when the difference between the calculated average upper and lower temperature difference fluctuation range and the reference value is more than 0 and less than 1 degree, the determination result of the average upper and lower temperature difference fluctuation range is B. When the calculated average upper and lower temperature difference fluctuation range is 3 degrees or more, that is, when the difference between the calculated average upper and lower temperature difference fluctuation range and the reference value is 1 degree or more, the determination result of the average upper and lower temperature difference fluctuation range is C.

The reference value of the average reference temperature change rate is set to 1 degree or less. When the calculated average reference temperature change rate is 1 degree or less, that is, when the difference between the calculated average reference temperature change rate and the reference value is 0, the determination result of the average reference temperature change rate is A. When the calculated average reference temperature change rate is more than 1 degree and less than 3 degrees, that is, when the difference between the calculated average reference temperature change rate and the reference value is more than 0 and less than 2 degrees, the determination result of the average reference temperature change rate is B. When the calculated average reference temperature change rate is 3 degrees or more, that is, when the difference between the calculated average reference temperature change rate and the reference value is 2 degrees or more, the determination result of the average reference temperature change rate is C.

The overall determination result is calculated by the total point of the determination results of the three temperature environment diagnostic indexes, with 3 points for A, 2 points for B, and 1 point for C, for example. More specifically, when the total point of the determination results of the three temperature environment diagnostic indexes is 8 or more and 9 or less, the overall determination result is A. When the total point of the determination results of the three temperature environment diagnostic indexes is 5 or more and 7 or less, the overall determination result is B. When the total point of the determination results of the three temperature environment diagnostic indexes is 3 or more and 4 or less, the overall determination result is C.

Also, in the present embodiment, in addition to the overall determination result, a comment indicating a specific countermeasure for improving the current temperature environment is presented for the temperature environment diagnostic index whose determination result is C. An example of the comment presented for C is shown below.

The comment that is presented when the determination result of the average reference temperature change range is C is "The temperature change in one day tends to be large. Do you want to optimize the correction function?→Yes/No", for example. The correction function is a function of estimating the extension rate of each part of the apparatus main body 100 from the temperature data detected by the temperature sensors 5, 6, and 7 and correcting the position of the axis of the apparatus main body 100 in a direction to cancel it.

The comment that is presented when the determination result of the average upper and lower temperature difference fluctuation range is C is "The temperature change in the upper space is large. Please consider duct installation and ventilation fan installation." if the temperature in the lower portion is stable but the temperature in the upper portion has a large fluctuation, or "The temperature change at the lower space is large. Please pay attention to the opening/closing of the door and consider installing a screen or a vinyl curtain." if the temperature in the upper portion is stable but the temperature in the lower portion has a large fluctuation, for example.

The comment that is presented when the determination result of the average reference temperature change rate is C is "A sudden change in room temperature can be observed. Do you want to optimize the correction function?→Yes/No", for example.

Moreover, in the present embodiment, determination is performed with respect to an average reference temperature difference and an apparatus main body operation rate, wherein the average reference temperature difference is an index that indicates the influence of the temperature environment on machining accuracy throughout the past year, and the apparatus main body operation rate is an index that indicates the reliability of the determination results of the three temperature environment diagnostic indexes and the average reference temperature difference.

The average reference temperature difference is the difference between the average reference temperature of the month having the highest average reference temperature and the average reference temperature of the month having the lowest average reference temperature throughout the year. The average reference temperature difference is expressed as ($\Sigma$T)/M where $\Sigma$T is the total value per month of the reference temperature measured at predetermined time intervals, and M is the operable time of the apparatus main body 100 in the corresponding month.

Here, for the environment in which wire electric discharge machining is performed, it is desirable for the temperature fluctuation to be as small as possible throughout the year, and the decrease in machining accuracy is less likely to occur as the average reference temperature difference decreases. Therefore, by checking the determination result of the average reference temperature difference, it is possible to determine the possibility of a decrease in machining accuracy in the current temperature environment.

The reference value of the average reference temperature difference is set to 3 degrees or less. When the calculated average reference temperature difference is 3 degrees or less, that is, when the difference between the calculated average reference temperature difference and the reference value is 0, the determination result of the average reference temperature difference is A. When the calculated average reference temperature difference is more than 3 degrees and less than 6 degrees, that is, when the difference between the calculated average reference temperature difference and the reference value is more than 0 and less than 3 degrees, the determination result of the average reference temperature difference is B. When the calculated average reference temperature difference is 6 degrees or more, that is, when the difference between the calculated average reference temperature difference and the reference value is 3 degrees or more, the determination result of the average reference temperature difference is C.

If the determination result of the average reference temperature difference is C, similar to the three temperature environment diagnostic indexes described above, a comment indicating a specific countermeasure for improving the current temperature environment is presented. The comment that is presented when the determination result of the average reference temperature difference is C is "The temperature difference due to the season tends to be large. It is suggested to review the room temperature setting.→December to March: +1 to +2° C., June to August: −1 to −2° C.", for example.

The apparatus main body operation rate is the monthly average value of the operation time of the apparatus main body 100 of each day. The apparatus main body operation rate is expressed as H/D where H is the operation time of the apparatus main body 100 in a month, and D is the number of days of operability of the apparatus main body 100 in the corresponding month.

Here, as described above, the temperature sensors 5, 6, and 7 measure the temperature of each part of the apparatus main body 100 at predetermined time intervals. As the apparatus main body operation rate increases and the operation time of the apparatus main body 100 gets longer, the determination result calculated based on more temperature measurement results is obtained, so the reliability improves. According to the above, by checking the determination result of the apparatus main body operation rate, it is possible to determine the reliability of the determination result of the temperature environment diagnostic index.

The reference value of the apparatus main body operation rate is set to 8 hours or more. When the calculated apparatus main body operation rate is 8 hours or more, that is, when the difference between the calculated apparatus main body operation rate and the reference value is 0, the determination result of the apparatus main body operation rate is A. When the calculated apparatus main body operation rate is more than 7 hours and less than 8 hours, that is, when the difference between the calculated apparatus main body operation rate and the reference value is more than 0 and less than 1 hour, the determination result of the apparatus main body operation rate is B. When the calculated apparatus main body operation rate is 7 hours or less, that is, when the difference between the calculated apparatus main body operation rate and the reference value is 1 hour or more, the determination result of the apparatus main body operation rate is C.

Next, the overall determination result and the comment presented when a decrease in machining accuracy occurred in January 2018 will be described with reference to the calculation results of the three temperature environment diagnostic indexes, the apparatus main body operation rate, and the average reference temperature difference in each month of 2017 as shown in Table 1.

TABLE 1

|  | January | February | March | April | May | June | July | August | September | October | November | December |
|---|---|---|---|---|---|---|---|---|---|---|---|---|
| Average reference temperature change range | 2.3 | 2.6 | 3.2 | 3.5 | 3.9 | 4.2 | 4.5 | 4.7 | 3.9 | 3.2 | 2.7 | 2.5 |
| Average upper and lower temperature difference fluctuation range | 1.3 | 1.6 | 1.8 | 2.1 | 2.4 | 2.9 | 3.1 | 3.3 | 2.7 | 2.4 | 1.9 | 3.1 |
| Average reference temperature change rate | 1.2 | 1.4 | 1.5 | 2.2 | 2.5 | 3.4 | 3.7 | 3.5 | 3.0 | 2.3 | 1.7 | 2.0 |
| Apparatus main body operation rate | 5.6 | 8.2 | 10.2 | 5.2 | 6.3 | 7.8 | 8.5 | 10.0 | 12.7 | 10.5 | 6.2 | 12.8 |
| Average reference temperature difference | 18.6 | 18.2 | 20.4 | 22.3 | 23.2 | 24.5 | 25.6 | 26.4 | 23.4 | 22.8 | 20.5 | 19.0 |

The determination of the temperature environment diagnostic indexes and the apparatus main body operation rate is performed based on the most recent calculation result of the month when the machining accuracy dropped. Specifically, for example, if a decrease in machining accuracy occurs in mid-January 2018, the determination may be performed based on the calculation result of January 2018 obtained before the decrease in machining accuracy occurs. Alternatively, the determination may be performed based on the calculation result of December 2017 which is the previous month. In the following, for the three temperature environment diagnostic indexes and the apparatus main body operation rate, the determination of January 2018 is performed based on the calculation result of December 2017, and for the average reference temperature difference, the determination throughout the most recent year before January 2018 is performed based on the calculation results from January 2017 to December 2017.

The calculation results of the three temperature environment diagnostic indexes of December 2017 show that the average reference temperature change range is 2.5, the average upper and lower temperature difference fluctuation range is 3.1, and the average reference temperature change rate is 2.0. Therefore, the determination result of the average reference temperature change range of January 2018 is B, the average upper and lower temperature difference fluctuation range is determined as C, and the average reference temperature change rate is determined as C. Furthermore, since the total point of the determination results of the three temperature environment diagnostic indexes is 4 points, the overall determination result of the temperature environment diagnostic indexes is C. Therefore, the operator determines that "the current temperature environment is an environment that should be improved to achieve the desired machining accuracy and has large influence on machining accuracy" and tries to improve the temperature environment around the wire electric discharge machining apparatus. More specifically, a countermeasure is taken based on the above presented comment for the average upper and lower temperature difference fluctuation range and the average reference temperature change rate that are determined as C among the three temperature environment diagnostic indexes.

In addition, the calculation result of the average reference temperature difference throughout the most recent year before January 2018, that is, from January to December 2017 is 8.2, and the determination result of the average reference temperature difference is C. Therefore, the operator can determine that "the temperature change throughout the year is large and a decrease in machining accuracy is likely to occur due to the season". Therefore, similar to the average upper and lower temperature difference fluctuation range and the average reference temperature change rate, a countermeasure is taken based on the above presented comment.

In addition, the calculation result of the apparatus main body operation rate of December 2017 is 12.8, and the determination result of the apparatus main body operation rate of January 2018 is A. Therefore, the operator can determine that "the presented overall determination result of January 2018 is highly reliable."

Figure 2:
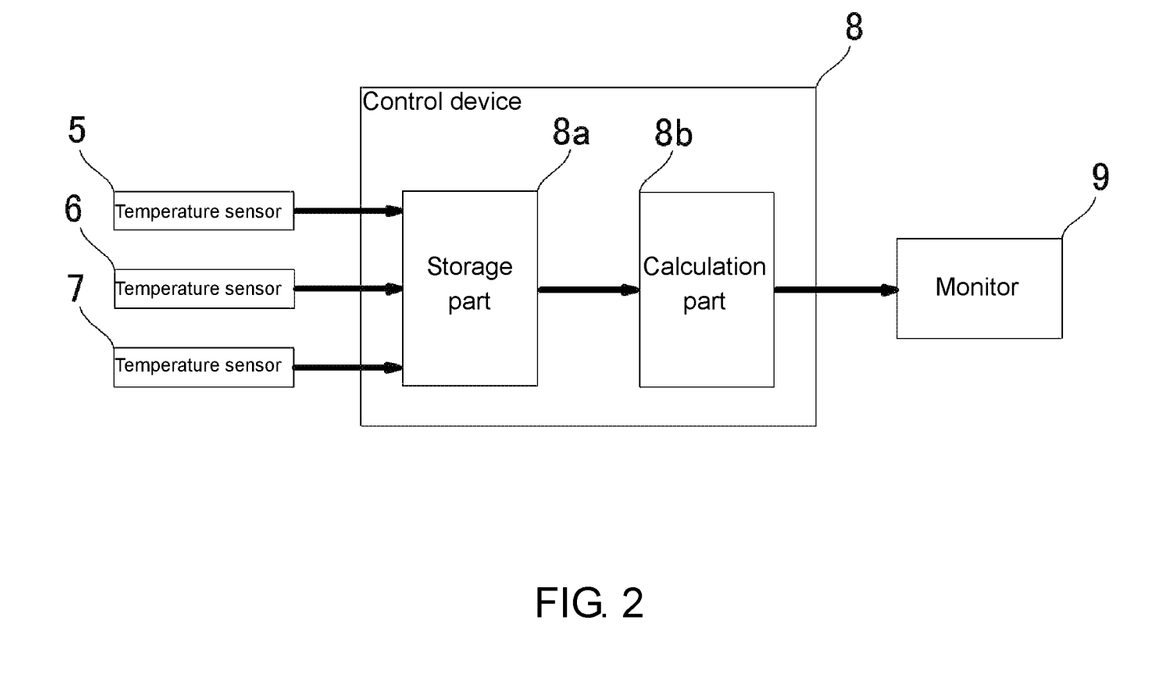
FIG. 2 is a block diagram showing control of each device for determining the three temperature environment diagnostic index, the apparatus main body operation rate, and the average reference temperature difference.

The control and operation of each device at the time when the above-described determination is performed will be described with reference to the block diagram shown in FIG. 2.

The temperature sensors 5, 6, and 7 respectively measure the temperatures of the upper portion, the middle portion, and the lower portion of the apparatus main body 100 at predetermined time intervals. The temperatures of the portions of the apparatus main body 100 measured by the temperature sensors 5, 6, and 7 are stored in the storage part 8a of the control device 8. The calculation part 8b of the control device 8 calculates the three temperature environment diagnostic indexes, the apparatus main body operation rate, and the average reference temperature difference based on the above formulae stored in the storage part 8a. More specifically, the calculation part 8b of the control device 8 calculates the average reference temperature change range and the average reference temperature change rate by applying the reference temperature, which is the temperature of the middle portion of the apparatus main body 100 stored in the storage part 8a, and the number of days of operation of the apparatus main body 100 to the above formulae. In addition, the calculation part 8b of the control device 8 calculates the average upper and lower temperature difference fluctuation range by applying the temperatures of the upper portion and the lower portion of the apparatus main body 100 stored in the storage part 8a and the number of days of operation of the apparatus main body 100 to the above formula. Furthermore, the calculation part 8b of the control device 8 calculates the apparatus main body operation rate by applying the operation time of the apparatus main body 100 stored in the storage part 8a and the number of days of operation of the apparatus main body 100 to the above formula. Also, the calculation part 8b of the control device 8 calculates the average reference temperature difference by applying the reference temperature stored in the storage part 8a and the operation time of the apparatus main body 100 to the above formula. The calculation part 8b of the control device 8 compares the calculated three temperature environment diagnostic indexes, the apparatus main body operation rate, and the average reference temperature difference with the respective reference values stored in the storage part 8a, and calculates the determination results from the differences. The calculation part 8b of the control device 8 calculates the overall determination result based on the determination results of the three temperature environment diagnostic indexes and outputs it together with the determination results of the apparatus main body operation rate and the average reference temperature difference to be displayed on the monitor 9. Further, if any determination result of the three temperature environment diagnostic indexes and the average reference temperature difference is C, the calculation part 8b of the control device 8 outputs the corresponding comment from the storage part 8a and displays it on the monitor 9.

(Function/Effect)

In the present embodiment, when a decrease in machining accuracy occurs, the overall determination result calculated based on the determination results of the three temperature environment diagnostic indexes is displayed on the monitor 9. Since it is easy to grasp the influence of the current temperature environment on machining accuracy, it is possible to immediately determine whether a problem has occurred due to the temperature environment, which is one of the main factors causing the decrease in machining accuracy. Compared with investigating the cause of the decrease in machining accuracy from the beginning as described in the related art, it is possible to limit the cause of the decrease in machining accuracy. Thus, it is possible to reduce the time for identifying the cause and dealing with it after the problem occurs.

Moreover, when any of the three temperature environment diagnostic indexes is determined as C, a comment indicating the countermeasure for improving the temperature environment is displayed on the monitor 9 for the temperature environment diagnostic index. By presenting a specific method for improving the temperature environment based on past empirical rules in addition to the overall determination result, it is possible to promptly and accurately deal with the decrease in accuracy caused by the temperature environment.

Furthermore, determination is performed on the average reference temperature difference. Thereby, it is possible to determine the possibility of a decrease in machining accuracy in the current temperature environment.

In addition, determination is performed on the apparatus main body operation rate. Thereby, it is possible to determine the reliability of the overall determination result and the determination result of the average temperature difference that are presented.

Although exemplary embodiments of the disclosure have been described above, the disclosure is not limited to the above embodiments and examples, and it is possible to make various design modifications within the scope of the claims.

In the present embodiment, the temperature environment is determined based on three temperature environment diagnostic indexes, which are the average reference temperature change range, the average upper and lower temperature difference fluctuation range, and the average reference temperature change rate. However, the temperature environment may be determined based on at least one of the three temperature environment diagnostic indexes. For example, the temperature environment may be determined based on the average temperature difference fluctuation range and the average upper and lower temperature fluctuation range. Alternatively, the temperature environment may be determined based on only the average temperature difference fluctuation range. In that case, the determination result of the temperature environment diagnostic index may be presented without calculation of the overall determination result to determine the influence of the current temperature environment on machining accuracy. The priorities of the three temperature environment diagnostic indexes in determining the temperature environment are the average reference temperature change range, the average upper and lower temperature difference fluctuation range, and the average reference temperature change rate in the descending order of priority.

Although the desired machining accuracy is set to ±5 μm above, the desired machining accuracy may be set to an accuracy higher than ±5 μm or an accuracy lower than ±5 μm, for example. When the desired machining accuracy is higher than ±5 μm, the reference value and the difference determined as A are smaller than the above-mentioned values. Moreover, when the desired machining accuracy is lower than ±5 μm, the reference value and the difference determined as A are larger than the above-mentioned values.

In addition, although the determination result is determined in three steps, that is, A, B, and C, it may be determined in two steps, four steps or more.

Further, although the determination result is displayed as one of "A", "B", and "C" on the monitor 9, it may also be displayed as "excellent", "average", or "poor", for example.

Although the determination result is displayed by characters such as "A", "B", and "C" on the monitor 9, it may also be presented using lights of different colors such as "blue", "yellow", and "red" or different sounds, for example.

In addition, although the above describes that the disclosure is applied to a wire electric discharge machining apparatus, the disclosure may also be applied to other electric discharge machining apparatuses such as an engraving electric discharge machining apparatus.

What is claimed is:

1. An electric discharge machining apparatus for machining a workpiece by electric discharge machining, the electric discharge machining apparatus comprising:
    temperature sensors respectively attached to an upper portion, a middle portion, and a lower portion of the electric discharge machining apparatus and measuring temperatures of the electric discharge machining apparatus at predetermined time intervals;
    a control device calculating values of temperature environment diagnostic indexes, which are indexes for determining machining accuracy of the workpiece obtained when electric discharge machining is performed in a current temperature environment, from measurement results of the temperature sensors, comparing the values of the temperature environment diagnostic indexes with reference values of the temperature environment diagnostic indexes recommended for achieving desired machining accuracy, and outputting determination results indicating a degree of whether the current temperature environment around the electric discharge machining apparatus is appropriate for achieving the desired machining accuracy according to differences in the comparing; and
    a storage part storing the reference values and the determination results,
    wherein the temperature environment diagnostic indexes are indexes comprising temperature and time variables, and comprise at least one of an average reference temperature change range, an average upper and lower temperature difference fluctuation range, and an average reference temperature change rate,
    wherein the average reference temperature change range is an average value of a maximum change range of a reference temperature measured by the temperature sensor attached to the middle portion of the electric discharge machining apparatus in a predetermined period,
    the average upper and lower temperature difference fluctuation range is an average value of a difference between a maximum value and a minimum value of a temperature difference between the temperature measured by the temperature sensor attached to the upper portion of the electric discharge machining apparatus and the temperature measured by the temperature sensor attached to the lower portion of the electric discharge machining apparatus each day in a predetermined period, and
    the average reference temperature change rate is an average value of a maximum change rate of the reference temperature in a predetermined period which is obtained by measuring the maximum change rate of the reference temperature in the predetermined period and then averaging the measured values.

2. The electric discharge machining apparatus according to claim 1, wherein the control device outputs one overall determination result calculated based on the determination results.

3. The electric discharge machining apparatus according to claim 1, wherein a countermeasure for improving the determination results is stored in the storage part, and
    the control device outputs the countermeasure corresponding to the determination results that has been calculated.

4. The electric discharge machining apparatus according to claim 2, wherein a countermeasure for improving the determination results is stored in the storage part, and
    the control device outputs the countermeasure corresponding to the determination results that has been calculated.

5. The electric discharge machining apparatus according to claim 1, wherein the control device calculates an average reference temperature difference, which is a difference between an average value of a reference temperature in a predetermined period when an average value of the reference temperature is the highest throughout a year, and an average value of the reference temperature in a predetermined period when the average value of the reference temperature is the lowest, and the control device compares a value of the average reference temperature difference with a reference value of the average reference temperature difference recommended for achieving the desired machining accuracy, and outputs a determination result indicating a degree of possibility of a decrease in machining accuracy according to a difference in the comparing.

6. The electric discharge machining apparatus according to claim 2, wherein the control device calculates an average reference temperature difference, which is a difference between an average value of a reference temperature in a predetermined period when an average value of the reference temperature is the highest throughout a year, and an average value of the reference temperature in a predetermined period when the average value of the reference temperature is the lowest, and the control device compares a value of the average reference temperature difference with a reference value of the average reference temperature difference recommended for achieving the desired machining accuracy, and outputs a determination result indicating a degree of possibility of a decrease in machining accuracy according to a difference in the comparing.

7. The electric discharge machining apparatus according to claim 3, wherein the control device calculates an average reference temperature difference, which is a difference between an average value of a reference temperature in a predetermined period when an average value of the reference temperature is the highest throughout a year, and an average value of the reference temperature in a predetermined period when the average value of the reference temperature is the lowest, and the control device compares a value of the average reference temperature difference with a reference value of the average reference temperature difference recommended for achieving the desired machining accuracy, and outputs a determination result indicating a degree of possibility of a decrease in machining accuracy according to a difference in the comparing.

8. The electric discharge machining apparatus according to claim 4, wherein the control device calculates an average reference temperature difference, which is a difference between an average value of a reference temperature in a predetermined period when an average value of the reference temperature is the highest throughout a year, and an average value of the reference temperature in a predetermined period when the average value of the reference temperature is the lowest, and the control device compares a value of the average reference temperature difference with a reference value of the average reference temperature difference recommended for achieving the desired machining accuracy, and outputs a determination result indicating a degree of possibility of a decrease in machining accuracy according to a difference in the comparing.

9. The electric discharge machining apparatus according to claim 1, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

10. The electric discharge machining apparatus according to claim 2, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

11. The electric discharge machining apparatus according to claim 3, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

12. The electric discharge machining apparatus according to claim 4, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

13. The electric discharge machining apparatus according to claim 5, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

14. The electric discharge machining apparatus according to claim 6, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

15. The electric discharge machining apparatus according to claim 7, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

16. The electric discharge machining apparatus according to claim 8, wherein the control device calculates an average operation rate of the electric discharge machining apparatus in a predetermined period, compares a value of the average operation rate with a reference value of the average operation rate recommended for achieving the desired machining accuracy, and outputs a determination result indicating a degree of reliability of the determination result according to a difference in the comparing.

* * * * *